Patented Aug. 26, 1952

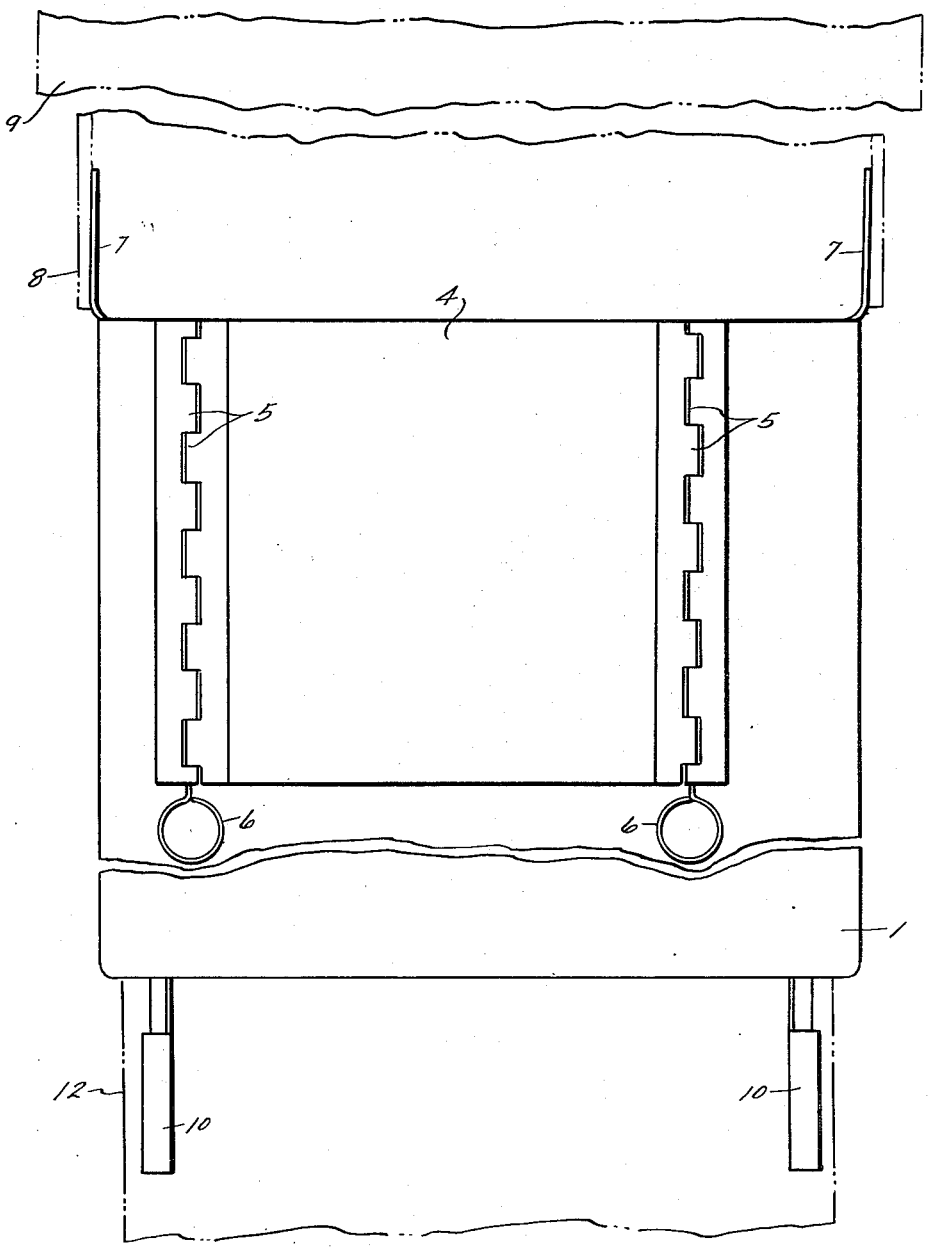

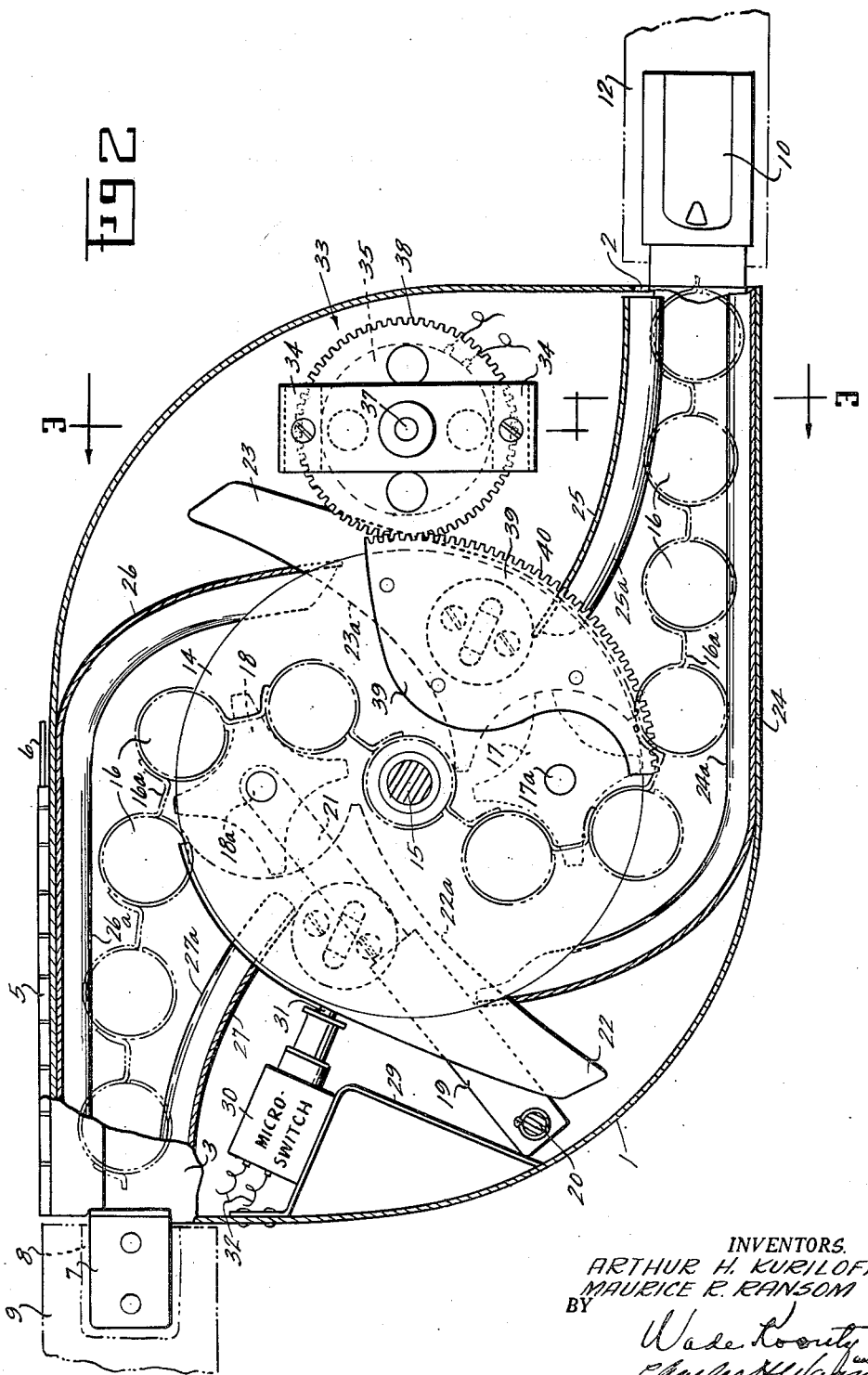

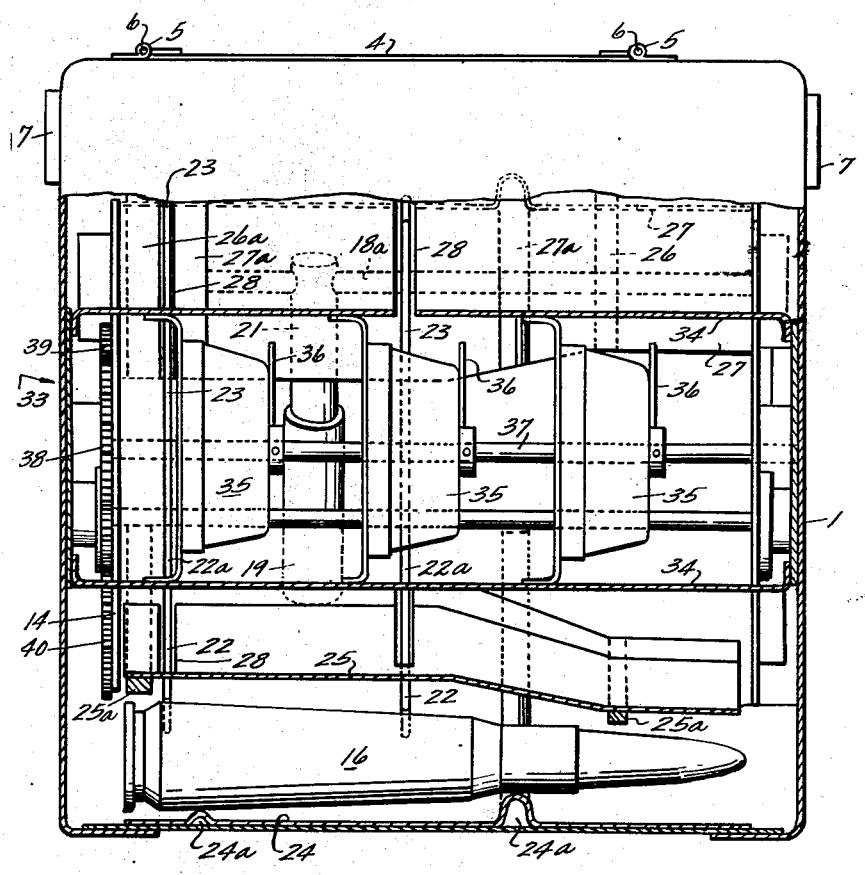

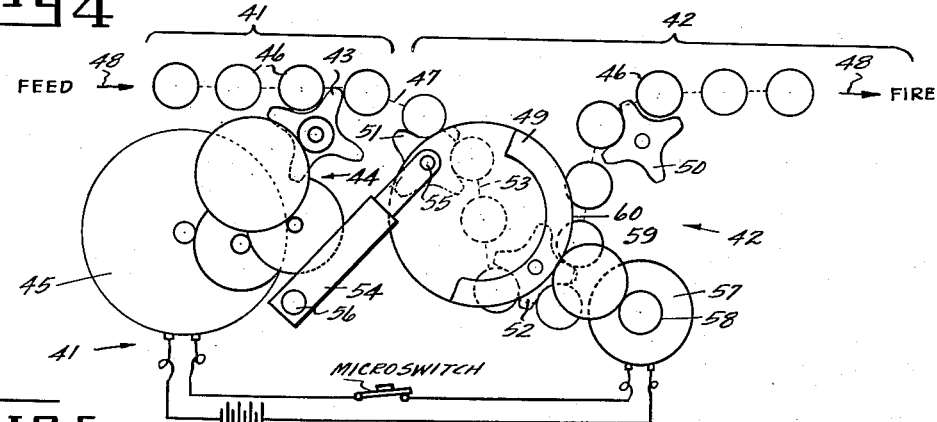
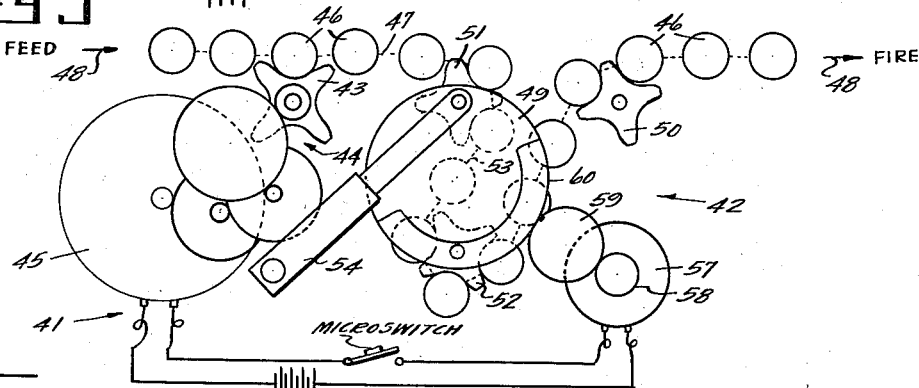
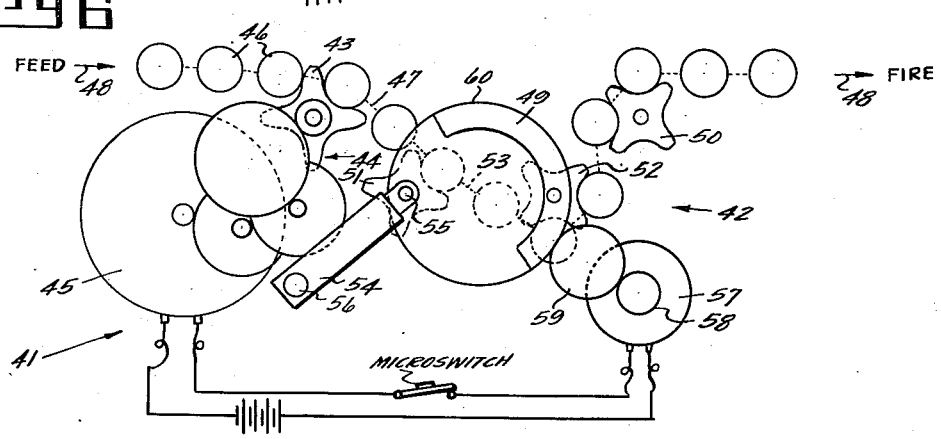

2,608,133

UNITED STATES PATENT OFFICE 2,608,133

ELECTRIC AMMUNITION ASSIST FEEDER CONTROL

Maurice R. Ransom, Torrance, and Arthur H. Kuriloff, Escondido, Calif., assignors to the United States of America as represented by the Secretary of the Air Force Application April 13, 1950, Serial No. 155,622

10 Claims. (Cl. 89—33)

This invention relates to ordnance and more particularly electric ammunition assist feeder control apparatus for machine guns.

In machine guns, particularly the cartridge belt fed types, used in aircraft and employing very long and heavy ammunition belts which are often supplied to the guns from magazines often located in the air crafts at considerable distances from the guns and supplied to the guns through flexible guideways or chutes it has been found desirable, and in fact almost essential, to utilize assist feeders or booster devices for maintaining a uniform and constant feed of the ammunition or cartridge belts into the cartridge receivers of the machine guns according to the rate of fire or demand of the guns.

These booster devices are usually driven by electric motors and contain feed sprockets which engage the "rounds" or cartridges which are joined together by what is known as a "disintegrating" ammunition belt, composed of link members having looped ends in which the cartridge cases form the pintles or hinges between the links so that as the cartridges pass into the gun receiver the cartridges are withdrawn from the links and the links separate, causing the belt to disintegrate, so to speak. A belt of this type is shown in conjunction with a conventional electric booster, in U. S. patent to C. C. Slate, No. 2,436,404, dated February 24, 1948, and illustrates a type of ammunition or cartridge belt that may be used in or with the subject invention.

In modern high speed fighter aircraft especially during battle maneuvers such as flying tight loops, banks, turns, and rolls where a great centrifugal force is effective on the plane, and also effective on the cartridge belt, especially on any slack portion in the belt between the gun receiver and the booster, tending to create more slack or pull on the belt at the gun receiver end, placing strain on the disintegrating belt links and the receiving and feeding parts of the gun which might cause "jamming" of the gun, especially if the guns are being fired during such abrupt turns and maneuvers.

In the subject invention these difficulties and objections are eliminated by the use of a rotary belt take-up carrier which is provided with spaced idler sprockets, at opposite sides of the carrier axis in which the belt trained over the sprockets and between them to provide a belt take-up device and belt support which not only takes up any slack incident to rotary displacement of the carrier but the centrifugal force or pull effective on the belt in the carrier is balanced between the sprockets, and therefore pull on the belt at the gun receiver from this cause is substantially reduced or eliminated. A spring is provided to rotate the carrier to take up the slack in the belt, and a rheostat device is provided, which is operated by rotative movement of the carrier to control the rate of operation of an electric booster motor for advancing the belt toward the gun.

When the gun is firing rapidly the gun cartridge receiver feed mechanism draws the belt toward the gun, takes out the slack in the belt, thus rotating the carrier and rotation of the carrier then adjusts the rheostat device to operate the booster at the desired feed rate. When the gun firing rate is reduced, or stopped, the booster feeding the cartridge belt through the carrier at the former rate introduces slack in the length of the belt, allowing the spring means to rotate the carrier to bodily displace the idler belt supporting sprockets to take up the slack in the belt while still firmly supporting that portion of the belt in balanced relation against centrifugal forces. Rotation of the carrier by the spring means to take up the slack created adjusts the rheostat device to decrease the booster motor speed to the demand rate as required by the gun. When the gun ceases firing the booster continues until the carrier is moved to its full take-up position where it actuates a microswitch and interrupts the booster motor drive circuit to discontinue the booster motor operation.

An object of the invention is the provision of an assist feeder and control apparatus therefor in which the mass or weight of the ammunition passing through the control device is "balanced" and therefore cannot be materially effected by the centrifugal forces during maneuvers of an air craft having the apparatus installed thereon.

Another object is the provision of an ammunition belt take-up control device in which means are provided for taking up the slack in a cartridge belt at opposite sides of the rotative center of a rotary take-up carrier member, including means operable by rotative displacement of the take-up member for regulating the speed of a cartridge belt booster motor feeding a cartridge belt through the carrier member at a predetermined ratio to the adjusted position of the take-up carrier member.

Other objects and advantages will become apparent from the following description, taken in connection with the accompanying drawings in which like reference characters refer to like parts in the several figures.

In the drawings:

Figure 1 is a top plan view of one form of booster control apparatus illustrating the guide chute and the machine gun cartridge receiver somewhat diagrammatically and in phantom lines;

Figure 2 is a vertical longitudinal sectional view taken through the booster control apparatus shown in Figure 1, the disintegrating cartridge belt and rounds of ammunition being shown in phantom lines;

Figure 3 is a somewhat diagrammatic cross sectional view taken approximately on line 3—3 of Figure 2 looking in the direction of the arrows; and Figures 4, 5 and 6 are somewhat diagrammatic views of a slightly modified arrangement including an associated booster device and schematically showing the wiring control arrangement between the rheostat which is actuated by the take-up carrier and the booster motor control circuit. Figure 4 illustrates the position of the take-up carrier and sprockets during equal rates of feed and fire. Figure 5 is similar, but illustrates the position of the take-up carrier and sprockets when the booster feed greatly exceeds the demand or rate of fire of the gun in the booster power "cutoff" position. Figure 6 illustrates the adjusted position of the parts when the demand or rate of fire of the guns exceed the rate of feed of the belt by the booster motor.

Referring more particularly to Figures 1 to 3 the reference numeral 1 denotes a support or supporting casing having a cartridge belt inlet opening at 2, and an outlet opening at 3 in the opposite end of the casing. An access door 4 is provided in the top of the casing 1, hinged at 5, and provided with removable pintles 6, permitting the door 4 to hinge open from either side, or to be fully removed.

Projecting from the casing at opposite ends of the outlet 3 are securing arms 7 adapted to detachably engage suitable cooperating securing latch members 8 located either, at the end of a conventional ammunition chute leading to the machine gun receiver, or mounted directly on the gun receiver which is diagrammatically indicated at 9, by a pair of cooperating latches fixed on the receiver or breach of the gun. These supporting latches 8 are preferably similar to the latch members 10 at the inlet opening 2 so as to be interchangeably connectable with a pair of securing arms, similar to the arms 7, but located on an ammunition feed chute 12 which cooperates with an electrically driven booster device located intermediate the ends of an ammunition chute which leads from an ammunition supply magazine (not shown) to the control device casing inlet 2. A portion of the ammunition chute is diagrammatically illustrated in Figure 1, and the electrically driven booster is interposed in the length of this chute and has an electric drive motor for advancing the belt through the chute 12.

Located within the casing 1 intermediate the inlet and outlet openings 2 and 3 is a rotary, belt take-up means or sprocket supporting carrier 14 which is journaled for rotation on an axis or shaft 15 disposed perpendicular to the direction of movement of the ammunition belt 16 through the casing from the inlet 2 to the outlet 3. The ammunition belt 16 is conventional, comprising metallic links 16ª with loops forming the interconnecting hinges with the rounds of ammunition or shells forming the hinge pintles. When the shells are withdrawn the links separate or "disintegrate" and are ejected as the "rounds" pass into the cartridge chamber or receiver of the gun.

The take-up carrier 14 is provided with spaced side plates or disks connected together, on which are journaled spaced idler sprockets 17 and 18, the sprockets being freely rotatable on parallel axes or shafts 17ª and 18ª located parallel to and equidistant from the carrier axis 15 at opposite sides thereof. The axes or shafts 15, 17ª and 18ª are disposed substantially in a single plane which is normally disposed, as shown in Figure 2, substantially perpendicular to the direction of movement of the belt 16 into the inlet 2 from the supply chute 12, and relative to the belt movement out of the control device casing 1 through the outlet 3. Spring means 19 are provided for yieldably holding the take-up carrier 14 with the idler sprockets 17 and 18 in the aforesaid substantially transverse plane as shown in the drawings. The spring means 19 comprises a pair of telescope sleeve members with a compression coil spring therein, one end of the spring means being connected to the casing 1 at 20 and the other end to the carrier at 21, for instance, connected to the idler sprocket shaft 18ª. Rotation of the carrier 14 counterclockwise from position as shown in Figure 2 bodily displaces the respective idler pulleys 17 and 18 in an orbit toward the respective inlet and outlet openings 2 and 3, shortening the telescopic sleeve member 19 and compressing the coil spring therein.

Projecting from the opposite sides of the carrier 14 are pairs of ammunition belt guide plates or arms 22 and 23, the arms having guide edges 22ª, 23ª. These guide plates are fixed to the carrier 14 and lie substantially in the plane of rotation of the sprockets 17 and 18. Pairs of curved supporting guide plate members 24, 25 and 26, 27 curve inwardly from the opposite sides of the inlet and outlet openings 2 and 3, respectively, with the plates 25 and 27 curving toward the rotary axis of the carrier 14, and the other plates 24 and 26 curving from the bottom and top inner sides of the casing toward the periphery of the carrier 14 as shown, suitable slots 28 being formed in the plates 24 to 27, for the arms 22, 23 to pass through as the carrier 14 is rotated. Each pair of the curved plates 24, 25 and 26, 27 flare outwardly toward the opposite sides of the idler sprockets 17 and 18, respectively, when the carrier 14 is rotated to the position shown in Figure 2, the plates each being provided with a pair of raised guide ribs 24ª, 25ª and 26ª, 27ª for engaging the sides of the cartridge shells, guiding the rounds of ammunition through the casing, around and between the idler sprockets 17 and 18, from the inlet opening 2 to the outlet opening 3, supporting the sides of the cartridge cases of the belt 16 between the respective openings and the take-up carrier 14 either when excessive slack occurs in the belt, or when an abnormal amount of slack is removed by the cartridge feed mechanism on the gun.

Located within the casing 1 on a suitable shelf or bracket 29 is a microswitch 30 having an actuating plunger 31 disposed in the path of movement of one of the guide arms 22 so that rotation of the carrier 14 clockwise to full take-up position actuates the microswitch 30 to open a control circuit to the ammunition assist booster motor by interrupting the circuit through the conductors 32 forming a part of the booster motor operating circuit. Means are also provided for regulating the speed of the assist booster according to the rate of fire or demand of the gun. This comprises a speed control device indicated generally at 33 such as a rheostat unit comprising supporting brackets 34 having one or more rheostats or variable resistance units 35 fixed thereto with contact "sliders" fixed to an actuating shaft 37. The shaft 37 is journaled in suitable bearings at the sides of the casing 1 and a spur gear 38 is fixed on the shaft for rotative adjustment thereof incident to rotative displacement of the belt take-up carrier 14. The carrier has a gear segment 39 fixed thereon with gear teeth 40 meshing with the teeth of the spur gear 38. As the carrier 14 is rotated from the position shown in Figure 2 the arm 22 first disengages the microswitch 30 permitting the microswitch to close the booster circuit and start the ammunition assist booster. At this time the sliders are at the outer ends of the resistance units and the inductance is highest causing maximum electrical resistance to be introduced into the booster circuit. The booster motor operates relatively slow at this time but as the gun fire is accelerated the feed mechanism in the gun receiver moves or pulls the belt faster than the opposite or magazine end, reduces the slack between the inlet and outlet opening 2 and 3 in the supporting casing 1. Reduction of this slack causes the belt to shift the upper and lower idler sprockets 18 and 17 bodily on their orbits respectively to the left and right, rotating the take-up carrier counter-clockwise, compressing and tensioning the return spring device 19. The gear segment 39 on the carrier rotates the gear 38 to adjust the sliders to decrease the electrical resistance offered by the resistance units 35, causing the booster motor to rotate faster and increase the rate of feed of the belt through the casing 1 and into the gun. The take-up carrier 14 will continue to rotate to the left from the position shown in Figure 1 until either the rate of fire of the gun is reduced or discontinued, or until the booster motor advances the belt at the rate equal to that in which it is drawn into the gun receiver. In the latter case the "feed" is balanced, with the booster feeding the belt at the rate of fire or demand of the gun. When the rate of fire is reduced or discontinued the booster will feed the belt faster than the demand of the gun, creating slack in the belt, permitting the spring device 19 to rotate the carrier 14 to the right to increase the electrical resistance in the booster motor drive circuit, or to open the booster motor drive circuit to stop the booster motor, as the case may be.

The spring tension device 19 causes the carrier to take out any slack in the belt between the inlet and outlet openings and maintain a predetermined supporting tension on the belt, which is important. Since the belt 16 is tensioned and passes over the idler sprockets 17 and 18 in reverse directions at opposite sides of the rotative axis of shaft 15 of the carrier 14, any centrifugal force effective on the rounds of ammunition in the belt between the inlet and outlet openings is balanced, so to speak. This is particularly important when an aircraft incorporating the improved control apparatus makes violent and continued battle maneuvers. This balancing effect reduces or eliminates excessive centrifugal pull on any "slack" portion of the belt which is not positively supported since this portion is always fully supported by the two idler pulleys 17 and 18 and therefore the guns can be fired without likelihood of jamming due to the centrifugal force causing a pull on, and resistance to the movement of the belt into the gun.

Threading of the belt through the casing 1 is also very easy and convenient. The belt is fed from the ammunition magazine, through the flexible chute, past the assist booster, and into the inlet opening 2. Continued feed of the belt will cause the round to engage the guide ribs 24ª, the guide arms 22 directing the belt around the lower idler pulley 17 and across the take-up carrier axis 15 where it engages the other arms 23 and guide ribs 26ª which direct the belt automatically around the upper idler sprockets 18 and out of the casing 1 through the outlet opening 3. The door 4 may be opened for inspection and adjustment of the sprockets 17 or 18 to see that the rounds properly seat between the teeth thereof, and to thread the belt into the gun receiver, and take out any "excessive" slack so that the belt will be properly trained around the two sprockets units 17 and 18, substantially as shown in Figure 2, with the arm 22 in circuit breaking contact position with the micro-switch plunger 31.

Referring to Figures 4 to 6, which diagrammatically disclose a combined booster and belt take-up control device therefor, respectively in three conditions. Figure 4 in "equal feed and rate of fire" condition. Figure 5 in "overfeed condition with respect to rate of fire" and Figure 6 in "underfeed condition relative to the rate of fire or demand of the guns." The reference numeral 41, denotes the ammunition belt feed assist or booster, and the improved belt take-up and control device is indicated generally at 42. The booster device 41 comprises axially spaced feed sprockets 43 which are power driven through a train of gears 44 by an electric motor 45. The teeth of the sprockets 43 engage the sides of the cartridge shells or rounds of ammunition 46 in the ammunition belt 47 at longitudinally spaced points on the shells, advancing the belt in the direction of the arrows 48 and through the take-up unit and booster speed control device 42 toward the gun receiver and firing mechanism.

This form of the apparatus is similar to the form shown in Figures 1 to 3 except that the inlet and outlet openings are substantially in the same plane or elevation, and the ammunition belt 47 loops downwardly through the take-up carrier 49 and around the lower idler sprocket 52 and then upwardly, passing over an idler sprocket 50 and out through an outlet opening and toward the gun, in the direction of the right hand arrows 48. The slack in the belt 47 is in the form of a U and is fully supported by the spaced idler sprockets 51 and 52 on the carrier 49 and the sprocket 50. When the gun is fired a pull on the belt 47 is caused by the firing mechanism in the gun receiver, rotating the sprocket 50, pulling upwardly on the looped or slack portion of the belt. Upward movement of the right hand reach of the belt looped portion 53 which elevates the sprocket 52 bodily, rotates the carrier 49 counterclockwise. There is also a tendency of the left hand reach of the belt 47 between the idler sprocket 52 and the booster driven sprocket 43 to straighten out, which tends to move the upper sprocket 51 bodily downward, assisting in the rotative displacement of the carrier in the counterclockwise direction. A spring loaded follow-up arm or telescopic spring tensioning member 54 is pivoted at 55 at one end to the shaft for sprocket 51, and at the other end at 56 to a fixed point. This tension device 54 yieldably tensions the take-up carrier 49 in a clockwise direction tending to rotate the same to the position shown in Figure 5.

A variable electrical resistance speed control device 57 is connected in the booster motor circuit for controlling the speed and power of the booster motor 45. The resistance device 57 is adjusted by a gear 58, meshing with an idler gear 59, which in turn meshes with a gear or gear segment 60 fixed to the carrier 49. Rotation of the carrier from the position shown in Figure 4 to the position shown in Figure 5 adjusts the gear 58 to increase the resistance in the electric circuit to the booster motor 45, and finally to interrupt the booster circuit similar to the manners shown in Figure 1. Rotation of the carrier, on the other hand, from the position shown in either Figure 5 or 4 toward the position shown in Figure 6 rotates the gear 58 in the opposite direction to decrease the resistance in the booster drive circuit, causing the booster to feed the belt faster.

With the carrier 49 adjusted to any of the three positions shown in Figures 4 to 6 it will be observed that the ammunition belt 47 is fully and equally supported throughout the looped portion 53 by the take-up carrier sprockets 51 and 52, at equal distances at opposite sides of rotative axis of the carrier, and by sprockets 43 and 50. Centrifugal, and also static forces effective on the belt, during the flying of an aircraft having guns fed by and through the improved assist feeder control apparatus, are balanced as far as belt supporting effect is concerned, permitting the belt to be fed easily and uniformly according to the rate of fire and demand of the gun under any and all flying conditions, thus reducing or eliminating the tendency of jamming of the belt in guns because of the centrifugal forces effective thereon.

In the drawings one embodiment of the invention is shown, together with a slight modification of such embodiment, it being obvious that various minor changes and modifications may be made in the construction and arrangement without departing from the spirit of the invention as claimed in the following claims.

What we claim is:

1. In a machine gun ammunition belt feed take-up control device, a support adapted to be mounted adjacent a belt fed machine gun and formed with spaced ammunition belt inlet and outlet guide means thereon for guiding an ammunition belt through the take-up control device, rotary ammunition belt take-up means journalled on the support intermediate the spaced inlet and outlet guide means for rotation about an axis perpendicular to the direction of movement of the ammunition belt through the take-up control device between the spaced inlet and outlet guide means, spaced ammunition belt supporting idler guide sprockets journalled for free rotation on the rotary take-up means on parallel axes at opposite sides of the rotary take-up means axis parallel to the take-up means axis for receiving and guiding the ammunition belt therebetween, and bodily shiftable by rotative displacement of the rotary take-up means on the support, on an orbit around the rotary take-up means axis, and yieldable tensioning means operably connected between the support and the rotary take-up means for rotatively displacing the rotary take-up means about its axis to bodily shift the idler sprockets about the rotary take-up means axis to engage the ammunition belt at spaced points at opposite sides of the take-up means axis to take up slack in the ammunition belt between belt inlet and outlet guide means.

2. A machine gun ammunition belt take-up control device having a support adapted to be mounted adjacent a belt fed machine gun, spaced ammunition belt inlet and outlet guide means carried by the support for guiding an ammunition belt through said take-up control device, rotary ammunition belt take-up means carried on the support comprising a supporting carrier journalled on the support for rotative adjustment about an axis intermediate the inlet and outlet guide means perpendicular to the direction of movement of the ammunition belt between the inlet and outlet guide means, ammunition belt take-up guide sprockets freely journalled on the supporting carrier to rotate on spaced axes parallel to the axis of the rotary carrier and at opposite sides of the carrier axis for receiving an ammunition belt between the spaced sprockets, spring actuating means connected between the support and the rotary supporting carrier for rotatively displacing the carrier about its rotative axis to displace the sprockets bodily about the axis of the carrier to engage the belt and displace spaced portions of the belt in opposite directions between the inlet and outlet guide means to take up slack in the ammunition belt intermediate the inlet and outlet guide means.

3. In a machine gun cartridge belt feed control apparatus, cartridge belt guide means for guiding a cartridge belt to a machine gun having a cartridge receiver, a cartridge belt booster device for advancing the belt through the guide means, regulatable power means connected to the booster device for driving the booster to advance the belt toward the gun at rates proportional to the rate of fire and demand of the gun comprising a supporting casing connected to the guide means, said casing having an inlet guide opening at one side for receiving the belt from the guide means and an outlet guide opening at its opposite side for receiving the belt from the inlet guide opening and guiding the belt from the casing toward the cartridge receiver of the gun, rotary cartridge belt take-up means journalled within the casing intermediate the inlet and outlet guide openings of the casing for rotative displacement on an axis perpendicular to the direction of movement of the belt between the inlet and outlet guide openings of the casing, spaced belt guide and take-up sprockets journalled for free rotation on the rotary belt take-up means on spaced parallel axes at opposite sides of rotary axis of the take-up means parallel to the take-up means axis the rotary axes of the sprockets and the take-up means normally substantially in a plane transverse to the direction of movement of the belt through the casing from the inlet guide opening to the outlet guide opening, co-operating belt guide means fixed on the casing and fixed on the rotary take-up means for guiding the cartridge belt from the inlet guide opening reversely around the sprockets and between the same toward the outlet guide opening, spring means operatively connected between the rotary take-up means and the casing for yieldably tensioning and holding the take-up means with the rotary axis thereof and the axes of the take-up sprockets in a plane transverse to the direction between the inlet and outlet guide openings, and adjustable power control means operatively connected between the take-up means and the casing, operably connected to the adjustable power means for adjustment thereof by rotative movement of the rotary take-up means incident to rotative displacement of the rotary take-up means by the belt, for regulating the speed of the booster device in a predetermined ratio to the rotative displacement of the take-up means by the belt.

4. In a cartridge belt feed control apparatus for machine guns, cartridge belt guide means, a power driven belt advancing booster device connected to the guide means for receiving an ammunition belt and advancing the same through the guide means, adjustable power control means for actuating the booster device to advance the belt at a rate proportional to the demand of a machine gun being supplied with cartridges by the belt, said power control means comprising a supporting casing having a belt inlet opening at one side in register with the guide means for feeding the belt into the casing and a belt outlet opening at its opposite side for guiding the belt out of the casing toward the gun, belt take-up means rotatably mounted within the casing intermediate the inlet and outlet openings for rotative displacement on an axis perpendicular to the direction of movement of the belt through the casing between the inlet and outlet openings, spaced belt guide and take-up sprockets mounted on said take-up means for free rotation about equally spaced parallel axes at opposite sides of the rotary axis of the take-up means, with the axis of the rotary take-up means and the axes of the sprockets disposed substantially in a plane normally transverse to the direction of movement of the belt into and out of the casing through the inlet and outlet openings thereof, with the belt extending from the inlet opening under and around one sprocket, then extending between the two sprockets, and over the other sprocket, and out of the casing through the outlet opening, whereby rotative movement of the take-up means about its rotative axis in one direction takes up slack in the belt between the inlet and outlet openings, and withdrawal of the belt through the outlet opening reduces slack in the belt and rotates the take-up means in the opposite direction, spring means operable between the take-up means and the casing yieldably tensioning the take-up means for rotation in the slack take-up direction, and adjustable speed control means for driving the booster device, connected between the casing and the take-up means, adjustable incident to relative rotative movement therebetween and connected to the booster device for speed control actuation thereof at rates proportional to the amount rotative displacement of the belt take-up means incident to slack in the belt between the inlet and outlet openings.

5. In machine gun cartridge belt booster control device, in combination, a machine gun, cartridge belt guide means for feeding belt ammunition into the gun at a rate proportional to the rate of fire and demand of the gun, comprising a power driven booster for feeding belt ammunition through said guide means, a support, a sprocket carrier rotatably mounted on the support on an axis transverse to the direction of movement of the belt through the guide means, a pair of idler sprockets rotatably mounted on the carrier on spaced parallel axes, one at each side of the carrier axis and parallel thereto, with the axes of the carrier and sprockets disposed substantially in a plane normally transverse to the direction of movement of the belt through the guide means, with the belt extending between the sprockets and around the opposite sides of the sprockets in relatively opposite directions, spring means operable between the carrier and the support, tensioning the carrier for rotative displacement about its axis to shift the sprockets bodily about the carrier axis to take up slack in the belt, and adjustable power control means operably connected between the carrier and the support and connected to the booster for speed control thereof, for regulating the speed thereof in proportion to the amount of slack in the belt and rotative adjustment of the carrier on the support, whereby the speed of the booster is reduced when the carrier is rotated by the spring means in the slack take-up direction when slack occurs in the belt, and whereby the speed of the booster is increased when the carrier is rotated by the belt in the opposite direction, incident tension on the belt, reducing the slack therein.

6. Apparatus as claimed in claim 5 in which electric motor means is provided for driving the booster at variable speeds in predetermined ratio to electric current which is supplied to the booster from an electrical power source, and the adjustable power control means regulates the strength of the current and is adjustable by rotative displacement of the carrier, in which the adjustable power control means is operatively connected in an electric power circuit to the booster motor means to regulate the current supplied to the booster motor means in predetermined ratio to rotative adjustment of the carrier as permitted by the amount of slack in the belt.

7. Apparatus as claimed in claim 6 in which the support comprises a hollow casing having spaced belt inlet and outlet ports located at opposite sides of the carrier and the spring means is operatively connected between the casing and to the carrier for effecting rotative displacement of the carrier to displace the carrier sprockets bodily in an orbit about the carrier rotative axis, and includes guide arms projecting from the carrier adjacent each of the idler sprockets for directing the belt across the carrier rotative axis between the sprockets.

8. Apparatus as claimed in claim 7 including pairs of guide track elements rigidly carried by the casing and extending respectively from the inlet and outlet openings of the casing at opposite sides of the rotative axis of each of the sprockets for guiding a cartridge belt through the casing and around the carrier idler sprockets, when the sprockets and carrier axes are in the aforesaid transverse plane relative to the direction of movement of the belt into and out of the inlet and outlet openings of the casing.

9. Apparatus as claimed in claim 8 including a microswitch fixed on the casing in the path of movement of one of the guide arms of the carrier for circuit controlling actuation thereof, and the microswitch is connected in a booster electric power circuit to open the circuit when the microswitch is actuated by said arm, incident to rotation of the carrier by the spring means when excessive slack occurs in the belt.

10. Apparatus as claimed in claim 7 in which adjustable power control means is mounted within the casing and comprises rheostat means connected in the power circuit to the booster motor, and includes a rotary actuating part which is drivably connected to the carrier to be actuated to adjust the rheostat incident to rotative adjustment.

MAURICE R. RANSOM.
ARTHUR H. KURILOFF.

REFERENCES CITED

The following references are of record in the file of this patent:

FOREIGN PATENTS

| Number | Country | Date |
| --- | --- | --- |
| 486,684 | Great Britain | June 9, 1938 |
| 558,949 | Great Britain | Jan. 28, 1944 |